(12) United States Patent
Robinson

(10) Patent No.: US 12,511,979 B1
(45) Date of Patent: *Dec. 30, 2025

(54) VIRTUAL RACE COURSE GENERATING AND VEHICLE WAGERING SYSTEM AND METHOD

(71) Applicant: Todd Christopher Robinson, McLean, VA (US)

(72) Inventor: Todd Christopher Robinson, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/070,635

(22) Filed: Mar. 5, 2025

Related U.S. Application Data

(63) Continuation of application No. 18/823,800, filed on Sep. 4, 2024, now Pat. No. 12,347,279.

(51) Int. Cl.
G07F 17/32 (2006.01)

(52) U.S. Cl.
CPC ...... G07F 17/3288 (2013.01); G07F 17/3227 (2013.01); G07F 17/3286 (2013.01); *G07F 17/326* (2013.01); *G07F 17/3272* (2013.01); *G07F 17/3279* (2013.01)

(58) Field of Classification Search
CPC .............. G07F 17/3288; G07F 17/326; G07F 17/3272; G07F 17/3279; G07F 17/3286
See application file for complete search history.

(56) References Cited

U.S. PATENT DOCUMENTS

| | | | | |
|---|---|---|---|---|
| 6,293,548 | B1* | 9/2001 | Swyers | A63F 3/00082 273/246 |
| 6,325,721 | B1* | 12/2001 | Miyamoto | G06Q 50/34 463/40 |
| 6,572,112 | B1* | 6/2003 | Fischer | G06Q 30/02 273/445 |
| 7,207,568 | B2* | 4/2007 | France | A63F 3/00082 273/459 |
| 8,118,675 | B2* | 2/2012 | Horowitz | G07F 17/32 463/40 |
| 8,491,366 | B2* | 7/2013 | Amaitis | G07F 17/32 463/6 |
| 10,035,060 | B1* | 7/2018 | Swyers | A63F 3/00082 |
| 10,515,515 | B2* | 12/2019 | Amaitis | G07F 17/32 |
| 11,189,135 | B2* | 11/2021 | Amaitis | G07F 17/3288 |
| 12,113,670 | B2* | 10/2024 | Brown | H04L 47/76 |
| 12,347,279 | B1* | 7/2025 | Robinson | G07F 17/3286 |
| 2002/0030625 | A1* | 3/2002 | Cavallaro | G01S 19/426 342/357.33 |
| 2007/0198939 | A1* | 8/2007 | Gold | H04L 67/125 715/757 |
| 2015/0213684 | A1* | 7/2015 | Daruty | G07F 17/3288 463/6 |
| 2023/0158409 | A1* | 5/2023 | Gardner | A63F 13/352 463/6 |

* cited by examiner

*Primary Examiner* — Illiam H Mcculloch, Jr.
(74) *Attorney, Agent, or Firm* — Stanzione & Associates, PLLC; Patrick Stanzione

(57) ABSTRACT

A system and method of generating a virtual race course including a starting line and a finish line for vehicles located within a location determined to have optimal conditions for input GPS coordinates, the system and method utilizing vehicle telematics to create a vehicle wagering network by connecting vehicles to mapping and traffic data.

17 Claims, 3 Drawing Sheets

Vehicle Wagering Network 300 Flowchart

VIRTUAL RACE COURSE GENERATING AND VEHICLE WAGERING SYSTEM AND METHOD

CROSS-REFERENCE TO RELATED APPLICATIONS

Figure 1:
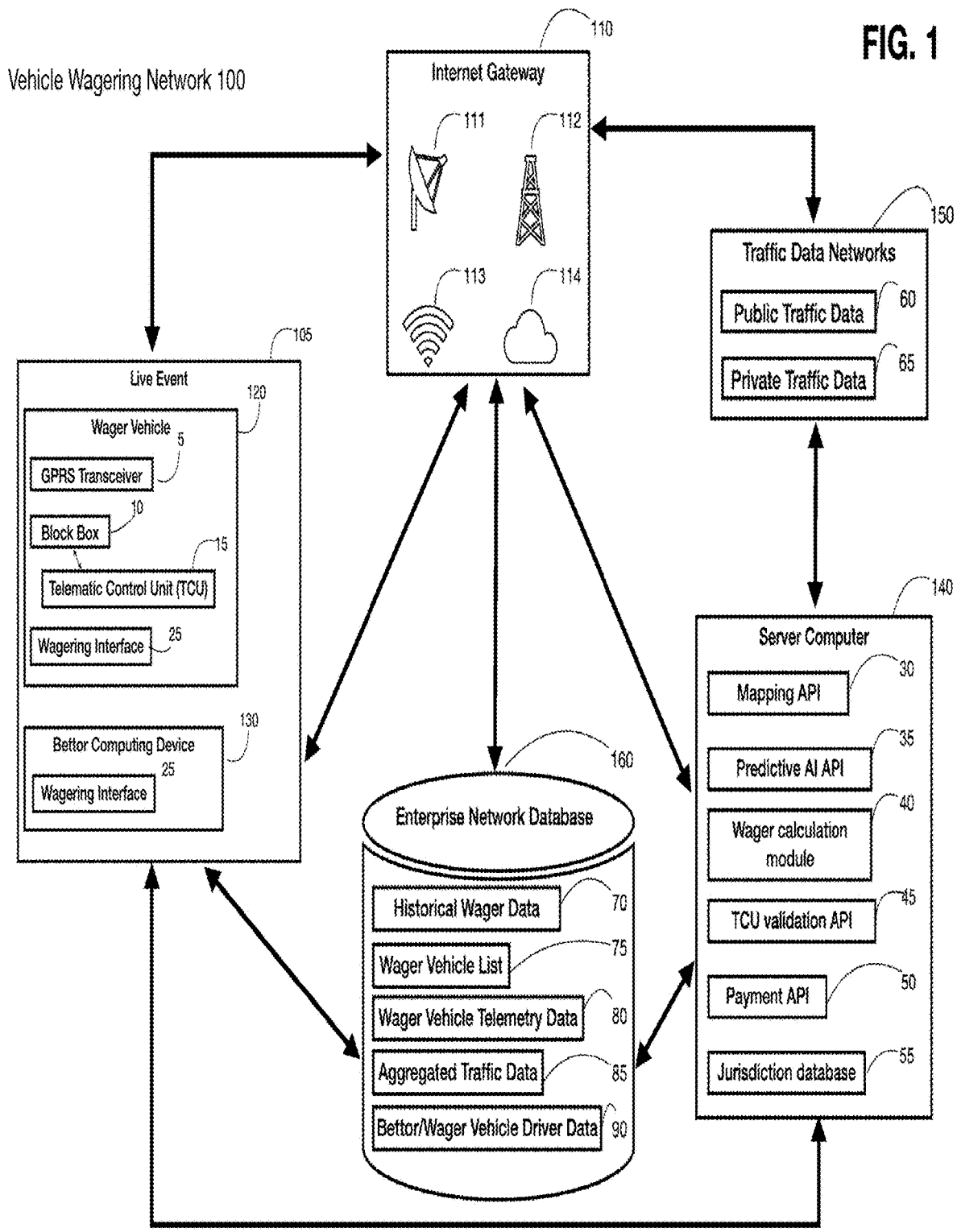

The present invention is a continuation of and claims the benefit of priority to U.S. application Ser. No. 18/823,800, filed Sep. 4, 2024, the entire disclosure of which is incorporated herein by reference.

DETAILED DESCRIPTION

The present invention comprises systems and methods for providing real-time and secure data from vehicle telemetry with applied analytics for use in betting or wagering on the vehicle performance, particularly in-motion betting and/or event-based and/or outcome betting. The proliferation of data collection from passenger and automotive sports vehicles has been bolstered by the expansion internet of things and satellite communications improvements. Many vehicles, whether internal combustion engine, hybrid or fully-electric, record and transmit data constantly to vehicle manufacturers and third-parties providing a wide range of internet-based services. It is common for vehicles manufactured in the present day to possess integrated black boxes which record and store vehicle performance data for both maintenance and safety purposes. Portable black boxes are an alternative to integrated black boxes, and they can be easily installed and removed to analyze driver and vehicle performance to improve efficiency and safety.

Black boxes record, store and transmit a variety of data from drivers and vehicles such as location, braking, speed, acceleration and proximity to surrounding vehicles with a high degree of accuracy. Accuracy is achieved through the use of numerous sensors placed throughout a vehicle's structure. This telemetry data can be utilized to create a novel betting or wagering environment.

With respect to the embodiments a summary of terminology used herein is provided.

An "action" refers to a specific data point collected by a vehicle telemetry sensors during the operation of vehicle. For example, an action may be the number of times the vehicle operator engages the brake pedal or accelerator of the vehicle.

A "bet" or "wager" is to risk something, usually a sum of money against someone else's or an entity on the basis of the outcome of a future event such as the results of a vehicles operation. It may be understood that non-monetary items may the subject of a "bet" or "wager" as well, such as points or anything else that can be quantified for a "bet" or "wager".

A "bettor" refers to a person who bets or wagers. A bettor may also be referred to as a user, client, or participant throughout the present invention. A "bet" or "wager" could be made for obtaining or risking a coupon or some enhancements to the future event, such as an entry into a raffle, etc. A "bet" or "wager" can be done for certain amount or for a future time. A "bet" or "wager" can be done within a certain period of time. A "bet" or "wager" can be integrated into the embodiments in a variety of manners.

The "black box" refers to an integrated crash resistant telematics device containing an electronic control unit (ECU) also referred to as a telematic control unit (TCU).

A "book" or "sportsbook" refers to a physical establishment that accepts bets on the outcome of sporting or vehicle event. A "book" or "sportsbook" system enables a human or artificial intelligence working with a computer to interact, according to a set of both implicit and explicit rules, in an electronically powered domain for the purpose of placing bets on the outcomes of a sporting or vehicle event. An added event refers to an event not part of the typical menu of wagering offerings, often posted as an accommodations to bettors. A "book" or "sportsbook" can be integrated into the embodiments in a variety of manners.

A "course" refers to a portion of a roadway on which a vehicle travels based on specific GPS coordinates or a specific amount of time.

A "driver" is refers to a human or autonomous operator of a vehicle on a course.

"IoT Cloud Server" refers to the server that collects data via the telematics control unit which is shared with the cloud-based telematics server through a highly secure GPRS or cellular network. On the IoT cloud platform, the data is extracted and stored in databases for processing.

The "price refers to the odds or point spread of an event. To "take the price" means betting the underdog and receiving its advantage in the point spread. "Price" can be integrated into the embodiments in a variety of manner "No action" means a wager in which no money is lost or and the original bet amount is refunded. "No action" can be integrated into the embodiments in a variety of manners.

The "money line" refers to the odds expressed in terms of money. The "odds" can be expressed in terms of an "over" or "under" wager based on an event. A "straight bet" refers to an individual wager on a course or event that will be determined by the odds. "Odds" and "straight bet" can be integrated into the embodiments in a variety of manners.

The "vehicle black box" or "black box" refers to an integrated or portable telemetry monitoring, recording and transmission device. The "black box" can be integrated into the embodiments in a variety of manners.

The "start/finish line" refers to a physical location at which a wager begins and ends. Both start and finish lines can be created by utilizing four GPS coordinates forming a rectangular zone.

"Telematics" refers to the system includes vehicle telematics devices, which are tracking devices installed into vehicles that facilitate the transmission and storage of telemetry data via wireless networks and the vehicle's own onboard modem and diagnostics.

"Telematic Control Unit" refers to the core unit of the telematics device. It has communication interfaces with the vehicle's CAN (Controller Area Network) bus and the IoT cloud server, streamlines Human Machine Interface data streams, and manages the memory and battery of the device as well. The bi-directional communication with the cloud server is established through a cellular, LTE, or GPRS network.

The "total" is the combined number of occurrences of an "action" registered by the vehicle black box. The "over" refers to a wager in which the bettor wagers that the action total of wager vehicle will be more than a specified total. The "under" to a wager in which the bettor wagers that the action total of wager vehicle will be less than a specified total. "Total", "over", and "under" can be integrated into the embodiments in a variety of manners The "wager vehicle" refers to the vehicle on which a better places a wager based on the telemetry data collected as a result of the driver's operation.

Customers are companies, organizations or individuals that would deploy, for fees, and may be part of, or perform various system elements or method steps in the embodiments.

Managed service user interface service is a service that can help customers) manage third parties, (2) develop the web, (3) do data analytics, (4) connect thru application program interfaces and (4) track and report on bettor behaviors. A managed service user interface can be into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service Is a service that helps customers manage (1) integrity monitoring, (2) play safety, (3) responsible gambling and (4) customer service assistance. These managed service compliance services car be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) TI support and (3) bettor account platform support. These managed service and technology platform services can be integrated into the embodiments in a variety of manners.

Managed service and marketing support services are services that help customers (1) acquire and retain clients and users, (2) provide for bonus options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further. these services can provide for integration of global and local payment methods. These payment processing services can be integrated into the embodiments in a variety of manners.

Engaging promotions allow customers to treat your bettors to free bets. odds boosts. enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cashout" or "pay out" or "payout" can be integrated into the embodiments in a variety of manners. including both monetary and non-monetary payouts. such as points. prizes. promotional or discount codes, and the like.

Business applications are an integrated suite of tools for customers to manager the everyday activities that drive sales, profit, growth by creating and delivering actionable insights on performance to help customers to manage the sports gaming. Business applications can be integrated into the embodiments in a variety of manners.

State based integration allows for a given sports gambling game to be modified by states in the United States or other countries. based upon the state the player is in. based upon mobile phone or other geolocation identification means. State based integration can be integrated into the embodiments in a variety of manners.

Software as a service (or SaaS) is a method of software delivery and licensing in which software is accessed online via a subscription, rather than bought and installed on individual computers. SaaS can be integrated into the embodiments in a variety of manners.

Synchronization of screens means synchronizing bets and results between devices, such as TC and mobile, PC and wearables. Synchronization can be integrated into the embodiments in a variety of manners.

Some embodiments of this disclosure, illustrating all its features will now be discussed in detail. It can be understood that the embodiments are intended to be open ended in that an item or items used in the embodiments is not meant to be an exhaustive listing of such item or items. or meant to he limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a vehicle wagering system 100. The system is comprised of the internet gateway 110, a live event 105, wager vehicle 120, computer server 140, traffic data networks 150 and a enterprise network database 160. Internet gateway 110 connects the various devices within the system through a combination of a satellite communication 111, terrestrial cellular network 112, WiFi network 113 and IoT cloud server 114. The live event 105 on which wagers are placed is the operation of a wager vehicle by a driver on a course. The course may be a public or private road and is identified by the predictive artificial intelligence application program interface (API) 35 monitoring both public traffic data network 50 and private traffic data network 55 for the optimal conditions to hold the live event 105. Once the optimal conditions for live event 105 have been identified, the mapping API 30 maps a course on which the wager vehicle's black box 10 will monitor and report telemetry data from the telematic control unit (TCU) 15 in conjunction with mapping API 30. The mapping of the course entails the creation of virtual start line and finish lines created by the combining of GPS coordinates forming a rectangle. In another embodiment of the present invention a time-based course designates when telemetry data reporting will commence and end. The course may be a public roadway such as an interstate highway, state route or street. Additionally, in some embodiments of the present invention the course can be a private road. When the mapping of a course is complete, the predictive AI API 35 in conjunction with the wager calculation module 40 generates a wager based on historical wager data 70, historical wager vehicle telemetry data 80, and aggregated traffic data 85. The wager may be an over/under bet based on wager vehicle telemetry data such as average speed, number of brake pedal taps, number of times the accelerator is engaged. Subsequent to the creation of a course and wager, the predictive AI API 35 accesses enterprise network database 160 and the wager vehicle list 65 to identify an available wager vehicle 120 to monitor on the course. Wager vehicle 120 has an integrated black box 10 and TCU 15 which gathers, stores and transmits vehicle telemetry via internet gateway 110. In order to validate the wager vehicle 120 eligibility, the black box telematic control unit validation API 45 sends callback messages to the wager vehicle TCU 15 to ensure the black box 10 is connected to the internet gateway 110 and monitoring the telemetric data underlying the live event 105 wager. Subsequent to the wager vehicle TCU 15 validation, the predictive AI API 35 analyzes aggregate traffic data 75 and publishes the wager to the bettor mobile computing devices 130 within the wagering interface 25 and a deadline by which bettors must place bets. A jurisdiction database 55 verifies a bettor's IP address is located in a territory that will allow the placing of bets. Upon traversing the start line or arriving at the designated start time, the wager vehicle 120 begins to transmit data from the TCU 15 via the internet gateway 110 to the wager calculation module 40. Real-time tracking and streaming of the wager vehicle telemetry data 80 is displayed within the wagering interface 25 of the bettor computing device. At the end of the distance-based (traversing the virtual finish line) or time-based course, the wager vehicle 120 telemetry data is verified by the TCU validation API 45 and wager calculation module 40 to determine the wager results. The wager results are then published to the bettor computing device 130 within the wagering interface 20. There will no-action in the live event if the wager vehicle 120 fails to complete the distance-based course or the wager vehicle's 120 TCU 15 stops transmitting data within the specific time frame. The publishing of the wager results will prompt either payment to bettors or collection from bettors based on the live event. Payment API 50 will facilitate the financial transaction related the wagers.

In various embodiments of the present disclosure, the driver and wager vehicle 120 are anonymized to prevent interference of the vehicle operation on the course. The direction of travel and public roadway may also be anonymized to prevent wager interference and ensure road safety.

In various embodiments of the present disclosure, the wager vehicle 120 may either be a passenger or commercial vehicle. Passenger vehicles may includes sedans, coupes, SUV, motorcycles, scooters, etc.

Figure 2:

FIG. 2 shows bettor computing device 130 as a mobile phone and the wagering interface 25 which communicates with server computer 140 and the enterprise network database 160 via the internet gateway 110. The wager interface 25 shows three wagering options available to the bettor while specifying the attributes of the wager. Each wagering options displays the city/region of the wager, the length of the course, the wager, the deadline by which bets must be placed and a button to initiate the placement of a bet. In embodiments of the present disclosure, the bettor device can be a desktop computer, laptop computer or tablet.

Figure 3:
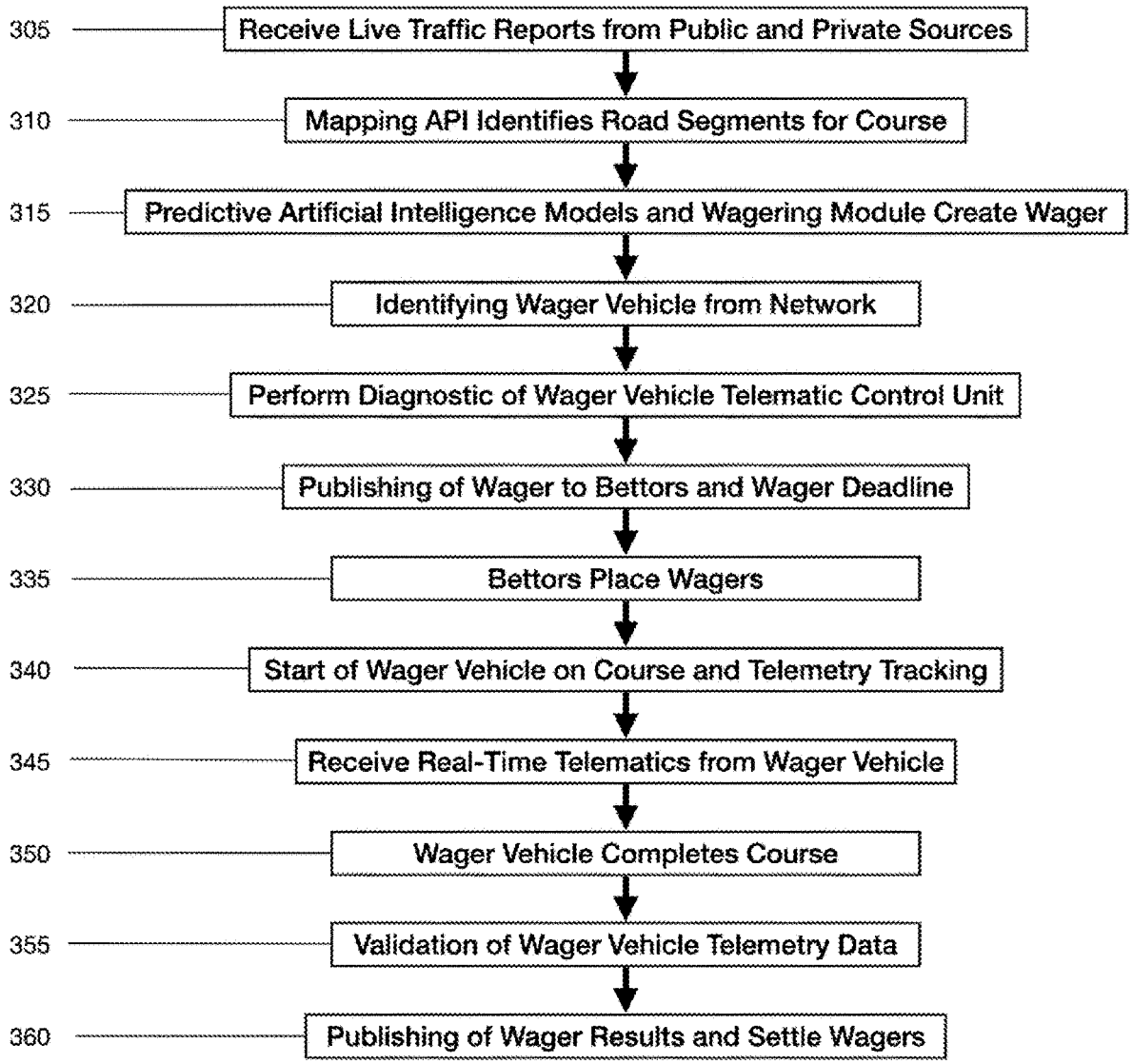

FIG. 3 displays a flow chart outlining the sequence of creating a wager for bettors to place wagers on within a vehicle wager network.

Further, embodiments may include a IoT cloud 114 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economics of scale, like a public utility. In contrast, third-party clouds allow organizations to focus on their core businesses instead of expending resources on computer infrastructure and maintenance. The IoT cloud 114 may be communicatively coupled to a peer-to-peer wagering network, which may perform real-time analysis on the type of wager course and the result of the wager. The cloud 114 may also be synchronized with wager course situational data such as the time of the wager, weather conditions, and the like, which may affect the style of vehicle operation utilized. For example, in an exemplary embodiment, the IoT cloud 114 may not receive data gathered from the TCU 15 and may, instead, receive data from an alternative data feed, such as LTE. This data may be compiled substantially immediately following the completion of any course as described in various exemplary embodiments herein.

Further, embodiments may include a bettor computing device 130 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, Fire Wire, Ethernet, Gigabit Ethernet, Fiber Channel, or Thunderbolt buses. In some embodiments, the bettor computing device 130 could be an optional component and would be utilized in a situation where a paired wearable device employs the bettor device 130 for additional memory or computing power or connection to the internet.

Further, embodiments may include a wagering software application or a wagering interface 25, which is a program that enables the user to place bets on individual plays in the live event 105, streams audio and video from the live event 105, and features the available wagers from the live event 105 on the mobile device 130. The wagering interface 25 allows the user to interact with the vehicle wagering network 110 to place bets and provide payment/receive funds based on wager outcomes.

Further, embodiments may include a bettor database 90 that may store some or all the user's data, the live event 105, or the user's interaction with the wagering network 110.

Further, embodiments may include the wagering network 110, which may perform real-time analysis on the driver performance on the live event course and the result of the action. The vehicle wagering network 100 (or the IoT cloud 114) may also be synchronized with course situational data. For example, in an exemplary embodiment, the vehicle wagering network 100 may not receive data gathered from the IoT cloud server 114 and may, instead, receive data from an alternative data feed, such as cellular network 112. This data may be provided substantially immediately following the completion of any course, as described in various exemplary embodiments herein. The vehicle wagering network 100 can offer several software as a service (SaaS) managed services such as user interface service, risk management service, compliance, pricing and trading service, IT support of the technology platform, business applications, course configuration, state-based integration, integration to allow the joining of social media, or marketing support services that can deliver engaging promotions to the user.

Further, embodiments may include a bettor and wager vehicle driver database 90, which may contain data relevant to all users of the vehicle wagering network 100 and may include, but is not limited to, a user ID, a device identifier, a paired device identifier, wagering history, or wallet information for the user. The bettor and wager vehicle driver database 90 may also contain a list of user account records associated with respective user IDs. For example, a user account record may include, but is not limited to, information such as user interests, user personal details such as age, mobile number, etc., previously played vehicle wager events, highest wager, favorite vehicle wager event, or current user balance and standings. In addition, the bettor and wager vehicle driver database 90 may contain betting lines and search queries. The bettor and wager vehicle driver database 90 may be searched based on a search criterion received from the user. Each betting line may include, but is not limited to, a plurality of betting attributes such as at least one of the live event 105, a course, a vehicle, an amount of wager, etc. The bettor and wager vehicle driver database 90 may include, but is not limited to, information related to all the users involved in the live event 105. In one exemplary embodiment, the bettor and wager vehicle driver database 90 may include information for generating a user authenticity report and a wagering verification report. Further, the bettor and wager vehicle driver database 90 may be used to store user statistics like, but not limited to, the retention period for a particular user, frequency of wagers placed by a particular user, the average amount of wager placed by each user, etc.

Further, embodiments may include a historical wager database 70 that may contain course and aggregated traffic data for the segment of a public road or private road course in the live event 105. For example, on I-695 in Cantonsville, MD between Baltimore National Pike and Wilkens Avenue, for optimal odds calculation, the historical aggregate traffic data may include metadata about the historical wager vehicle operation, such as time of day, weather, average speeds on road segment, etc.

Further, embodiments may utilize an historical wager data 70—that contains the odds calculated by an odds wager module 40—to display the odds on the bettor's computing device 130 and take bets from the user through the computing device wagering interface 25.

Further, embodiments may include the odds calculation module 40, which utilizes historical wager vehicle data to calculate odds for in-motion wagers.

Further, embodiments may include a jurisdiction database 55, which may contain the boundaries that define a legally relevant jurisdiction and the associated rules regarding when/if cash value wagering is allowed in that jurisdiction.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

The invention claimed is:

1. A system to generate a virtual race course for vehicles located within the race course to be wagered, the system comprising:
   a telematic control unit (TCU) configured to interface with a vehicle's Controller Area Network (CAN) to gather, store and transmit vehicle telemetry data for a vehicle in which the TCU is disposed;
   a server computer processor including:
      a mapping application program interface (API) configured to:
         monitor public traffic data and private traffic data:
         determine whether optimal conditions exist within the monitored public and private traffic data in which to generate a virtual race course, and
         generate a virtual race course including a starting line and a finish line from GPS coordinates input with respect to the determined optimal conditions and based on a detection of a TCU within the input GPS coordinates,
      a graphic user interface (GUI) downloadable to a mobile computing device and configured to enable a user to select a wager on a vehicle in which the TCU is disposed within the generated virtual race course, wherein the wager is generated based on vehicle telemetry data received from the TCU, and
      a wager calculation module configured to generate a wager based on historical wager data received, vehicle telemetry data received, and aggregated traffic data received;
   an enterprise network database to store historical wager data, a list of vehicles in which a TCU is disposed, historical wager vehicle telemetry data and aggregated traffic data; and
   an internet gateway to enable wireless communication between the server computer processor, the TCU, the network database and the downloaded GUI.

2. The system according to claim 1, wherein the mapping application program interface (API) comprises:
   an artificial intelligence application program interface (AIAPI) to access the enterprise network database to identify an available wager vehicle to monitor on a generated race course prior to the generation of the race course and the wager, to monitor a vehicle navigation system to determine its destination, to monitor the public traffic data and the private traffic data to determine the optimal conditions in which to generate the virtual race course, to analyze aggregated traffic data, and to publish the generated wager on the GUI and a deadline in which a wager must be placed.

3. The system according to claim 1, wherein the server computer processor also includes:
 a jurisdiction database configured to verify that an IP address of a mobile computing device using the GUI is located in a geographic location in which placing bets is allowed.

4. The system according to claim 1, wherein the TCU begins to transmit data through the internet gateway to the wager calculation module upon traversing the start line and the GUI displays real-time tracking and streaming of the TCU data.

5. The system according to claim 4, wherein the server computer processor further includes:
 a TCU validation API to send callback messages to the TCU to ensure that the TCU is connected to the internet gateway and to verify the wager vehicle telemetry data to determine the wager results.

6. The system according to claim 4, wherein the wager calculation module generates a wager to be an over/under bet based on vehicle telemetry data including at least one of an average speed of the vehicle, the number of times a brake pedal is tapped and the number of times an accelerator is engaged.

7. The system according to claim 6, wherein the wager calculation module determines the wager according to a predetermined distance in which the vehicle travels.

8. The system according to claim 6, wherein the wager calculation module determines the wager according to a predetermined time in which the vehicle travels.

9. The system according to claim 2, wherein the wager results are published through the GUI and the GUI then prompts either payment to the user based on the wager placed and the wager results or collection from the user based on the wager placed and the wager results.

10. The system according to claim 4, wherein the GUI displays three race course options in which a wager can be made.

11. The system according to claim 10, wherein each wagering option displays the city/region of the wager, the length of the race course, the wager, the deadline in which bets must be placed and a button to initiate the placement of a bet.

12. The system according to claim 1, wherein the virtual race course is defined within a fixed professional motorsport circuit, and the mapping application program interface (API) segments the racecourse into sectors to enable wagering.

13. The system according to claim 1, wherein the wager calculation module generates prop bets for professional motorsport events based on telemetry data received from an official motorsport data feed in place of a TCU.

14. The system according to claim 6, wherein the wager includes telemetry-based betting metrics relevant to motorsports, comprising sector speed, gear shifts, throttle percentage, drag reduction system (DRS) activation count, or G-force values.

15. The system according to claim 1, wherein the GUI displays professional motorsport wager events including driver names, team names, event name, and wagering metrics for each sector of the race.

16. The system according to claim 1, wherein the server computer processor includes a media stream integration module configured to synchronize telemetry-based wagering options with live audio/video streaming of a professional motorsport event.

17. The system according to claim 1, wherein the server computer processor includes an anonymization module configured to strip or mask personal identifiers and location metadata from telemetry data received from wager vehicles operating on public roads prior to publishing the data to the GUI or enterprise network database.

* * * * *